US010329020B2

(12) United States Patent
Smith et al.

(10) Patent No.: US 10,329,020 B2
(45) Date of Patent: Jun. 25, 2019

(54) INTEGRATED DEPLOYABLE LEG REST FOR RECLINING PASSENGER SEATS

(71) Applicant: Safran Seats USA LLC, Gainesville, TX (US)

(72) Inventors: Josh T. Smith, Denton, TX (US); Justin K. Murnan, Whitesboro, TX (US); Ty Parker, Sanger, TX (US); Raul G. Reyes, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 15/128,125

(22) PCT Filed: Apr. 2, 2015

(86) PCT No.: PCT/US2015/024123
§ 371 (c)(1),
(2) Date: Sep. 22, 2016

(87) PCT Pub. No.: WO2015/153902
PCT Pub. Date: Oct. 8, 2015

(65) Prior Publication Data
US 2017/0096225 A1    Apr. 6, 2017

Related U.S. Application Data

(60) Provisional application No. 61/974,492, filed on Apr. 3, 2014.

(51) Int. Cl.
*B64D 11/06* (2006.01)
*B60N 2/90* (2018.01)
*B60N 2/02* (2006.01)

(52) U.S. Cl.
CPC ........ *B64D 11/0643* (2014.12); *B60N 2/0224* (2013.01); *B60N 2/0232* (2013.01);
(Continued)

(58) Field of Classification Search
CPC .. B60N 2/0224; B60N 2/0232; B60N 2/4495; B60N 2/995; B64D 11/064; B64D 11/0643; B64D 11/06
See application file for complete search history.

(56) References Cited

U.S. PATENT DOCUMENTS 1,704,585 A  *  3/1929 Astruc ................. A47C 1/0342
                                                  297/184.11
3,226,155 A  *  12/1965 Whiteford ............ A47C 1/0355
                                                  297/259.2
(Continued)

FOREIGN PATENT DOCUMENTS

WO    2011070531    6/2011
WO    2015153902    10/2015

OTHER PUBLICATIONS

International Patent Application No. PCT/US2015/024123, Search Report and Written Opinion dated Jul. 16, 2015.
(Continued)

*Primary Examiner* — James M Ference
(74) *Attorney, Agent, or Firm* — Kilpatrick Townsend & Stockton LLP; Dean W. Russell; Melissa L. Love

(57) ABSTRACT

Described are reclining passenger seats having deployable leg rests coupled to the seat bottom. An actuator, which may be a gas cylinder, spring, or electric motor, moves the deployable leg rest between stowed and deployed positions. A locking mechanism may be used to stabilize the deployable leg rest in the stowed position, the deployed position, or any intermediate position. The coupling of the deployable leg rest to the seat bottom allows for a greater range of movement with a lighter, more compact mechanism.

25 Claims, 4 Drawing Sheets

(52) U.S. Cl.
CPC .............. *B60N 2/995* (2018.02); *B64D 11/06* (2013.01); *B64D 11/064* (2014.12)

(56) References Cited

U.S. PATENT DOCUMENTS

| | | | | |
|---|---|---|---|---|
| 3,339,971 A * | 9/1967 | Fletcher | ............... | A47C 1/0355 297/259.2 |
| 3,695,685 A * | 10/1972 | Lamb | ............... | A47C 1/02 297/271.4 |
| 4,113,311 A * | 9/1978 | Reida | ............... | A47C 7/506 297/423.32 |
| 4,509,795 A * | 4/1985 | Brennan | ............... | A47C 7/506 297/423.32 |
| 4,521,053 A * | 6/1985 | de Boer | ............... | A47C 1/022 297/291 |
| 4,819,987 A * | 4/1989 | Stringer | ............... | B60N 2/4495 297/423.31 |
| 4,966,413 A * | 10/1990 | Palarski | ............... | A47C 1/022 297/284.6 |
| 5,098,158 A * | 3/1992 | Palarski | ............... | A47C 1/022 297/234 |
| 5,352,020 A * | 10/1994 | Wade | ............... | B60N 2/4495 297/423.19 |
| 5,447,359 A * | 9/1995 | Asbjornsen | ............... | B60N 3/06 297/423.35 |
| 5,507,562 A * | 4/1996 | Wieland | ............... | A47C 7/506 297/423.2 |
| 5,527,095 A * | 6/1996 | Marshall | ............... | A47C 1/0352 297/258.1 |
| 5,651,587 A * | 7/1997 | Kodaverdian | ............... | B60N 2/0228 297/423.36 |
| 5,755,493 A * | 5/1998 | Kodaverdian | ............... | B60N 2/0228 297/362.14 |
| 6,045,190 A * | 4/2000 | Ward | ............... | B60N 2/20 297/376 |
| 6,194,853 B1 * | 2/2001 | Tual | ............... | G05B 19/0421 244/118.6 |
| 6,227,489 B1 * | 5/2001 | Kitamoto | ............... | B64D 11/00 244/118.5 |
| 6,237,994 B1 * | 5/2001 | Bentley | ............... | A47C 1/023 297/118 |
| 6,336,679 B1 * | 1/2002 | Smuk | ............... | B60N 2/0705 297/341 |
| 6,439,636 B1 * | 8/2002 | Kuo | ............... | B60N 2/0232 296/65.01 |
| 6,441,576 B1 * | 8/2002 | Marin-Martinod | ............... | B60N 2/0232 318/568.1 |
| 6,526,643 B1 * | 3/2003 | Renault | ............... | B60N 2/0244 29/407.05 |
| 6,764,137 B2 * | 7/2004 | Menard | ............... | B60N 2/0232 297/423.36 |
| 6,773,074 B2 * | 8/2004 | Flory | ............... | B60N 2/995 297/423.34 |
| 6,926,366 B2 * | 8/2005 | Wolters | ............... | A61G 13/12 297/423.36 |
| 7,004,542 B2 * | 2/2006 | Saint-Jalmes | ............... | A47C 7/024 297/284.11 |
| 7,293,839 B2 * | 11/2007 | Shimizu | ............... | A61H 7/004 297/423.17 |
| 7,597,398 B2 * | 10/2009 | Lindsay | ............... | B60N 2/0224 297/283.2 |
| 7,614,693 B2 * | 11/2009 | Ito | ............... | B60N 2/0284 297/284.11 |
| 7,669,928 B2 * | 3/2010 | Snyder | ............... | B60N 2/0232 297/283.2 |
| 7,950,743 B2 * | 5/2011 | Clausen | ............... | B60N 2/2209 297/423.27 |
| 8,016,355 B2 * | 9/2011 | Ito | ............... | B60N 2/62 297/284.11 |
| 8,167,370 B2 * | 5/2012 | Arakawa | ............... | B60N 2/0284 297/284.11 |
| 8,366,194 B2 * | 2/2013 | Yamamoto | ............... | B60N 2/0232 297/284.11 |
| 8,608,240 B2 * | 12/2013 | Marshall | ............... | A47C 7/506 297/69 |
| 8,882,190 B2 * | 11/2014 | Garland | ............... | A47C 7/506 297/85 L |
| 2002/0063449 A1 * | 5/2002 | Plant | ............... | B60N 2/34 297/68 |
| 2002/0113477 A1 * | 8/2002 | Uchiyama | ............... | A47C 1/0242 297/330 |
| 2003/0075966 A1 * | 4/2003 | Behnert | ............... | B60N 3/063 297/423.26 |
| 2003/0080597 A1 * | 5/2003 | Beroth | ............... | A47C 1/0352 297/330 |
| 2003/0209924 A1 * | 11/2003 | Bauer | ............... | A47C 1/0352 297/217.3 |
| 2004/0099766 A1 * | 5/2004 | Pratt, Jr. | ............... | B64D 11/06 244/118.6 |
| 2004/0100137 A1 * | 5/2004 | Johnson | ............... | B64D 11/0015 297/423.26 |
| 2004/0100138 A1 * | 5/2004 | Johnson | ............... | B64D 11/0015 297/452.18 |
| 2004/0189074 A1 * | 9/2004 | Seki | ............... | A47C 7/506 297/423.1 |
| 2005/0012377 A1 * | 1/2005 | Ito | ............... | B60N 2/0232 297/423.26 |
| 2006/0087158 A1 * | 4/2006 | Kramer | ............... | A47C 1/022 297/29 |
| 2006/0158015 A1 * | 7/2006 | Tsuji | ............... | B60N 2/4495 297/423.19 |
| 2007/0262635 A1 * | 11/2007 | Johnson | ............... | B64D 11/0649 297/452.33 |
| 2009/0322137 A1 * | 12/2009 | Kojima | ............... | B60N 2/0232 297/362 |
| 2010/0052395 A1 * | 3/2010 | Anglese | ............... | A47C 7/506 297/423.3 |
| 2010/0187881 A1 * | 7/2010 | Fujita | ............... | B60N 2/028 297/284.3 |
| 2010/0194169 A1 * | 8/2010 | Shinozuka | ............... | B60N 2/4495 297/423.26 |
| 2010/0244534 A1 * | 9/2010 | Driessen | ............... | B60N 2/4495 297/423.35 |
| 2010/0320819 A1 * | 12/2010 | Cohen | ............... | A61H 23/0236 297/217.4 |
| 2011/0215200 A1 * | 9/2011 | Mejuhas | ............... | B60N 2/62 244/118.6 |
| 2011/0240797 A1 * | 10/2011 | Behe | ............... | B64D 11/06 244/122 R |
| 2011/0241391 A1 * | 10/2011 | Lamparter | ............... | B60N 2/24 297/216.1 |
| 2012/0228919 A1 * | 9/2012 | Dowty | ............... | B64D 11/064 297/85 M |
| 2013/0249190 A1 * | 9/2013 | Engman | ............... | A61G 5/12 280/291 |
| 2013/0320139 A1 * | 12/2013 | Cho | ............... | B64D 11/06 244/118.6 |
| 2017/0088268 A1 * | 3/2017 | Kinard | ............... | B64D 11/0638 |
| 2017/0096225 A1 * | 4/2017 | Smith | ............... | B64D 11/0643 |
| 2017/0174345 A1 * | 6/2017 | Murnan | ............... | B64D 11/064 |

OTHER PUBLICATIONS

International Patent Application No. PCT/US2015/024123, International Preliminary Report on Patentability, dated Oct. 13, 2016.

\* cited by examiner

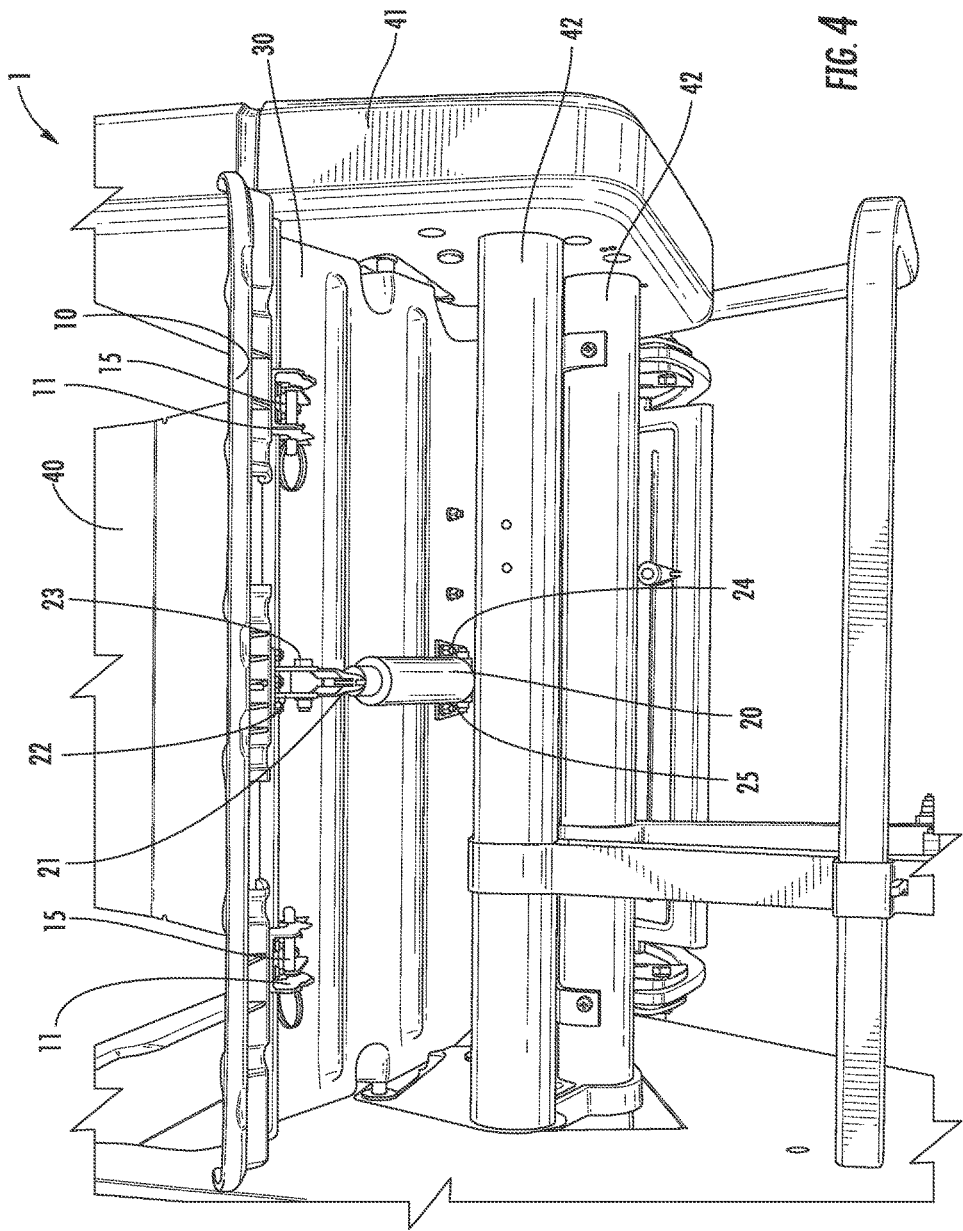

INTEGRATED DEPLOYABLE LEG REST FOR RECLINING PASSENGER SEATS

CROSS REFERENCE TO RELATED APPLICATIONS

This application is the U.S. national phase entry of International Patent Application Serial No. PCT/US2015/024123 ("the '123 application"), filed on Apr. 2, 2015, which application is related to and claims priority benefits from U.S. Provisional Application Ser. No. 61/974,492 ("the '492 application"), filed on Apr. 3, 2014, entitled "Deployable Legrest that Moves with the Seat Pan". The '123 and '492 applications are hereby incorporated in their entireties by this reference.

FIELD OF THE INVENTION

The field of the invention relates to passenger seats or the like, and more particularly to deployable leg rests for use with passenger seats.

BACKGROUND

Many passenger seats such as those on passenger aircraft, busses, trains, and the like are designed with a recline function to allow for greater comfort to passengers, particularly on longer journeys. To increase passenger comfort, seats may be designed with complex articulations, including different motions for the seat back and seat bottom or pan.

In some instances, a passenger seat may include a leg rest to support the passenger's calves, feet, or thighs when they are in a reclined position. These leg rests are typically mounted to a solid part of the passenger seat structure. For example, a leg rest may be mounted directly to a stationary part of the seat frame or to a seat tube. It is desirable to include a leg rest on a reclining seat to increase passenger comfort. The conventional method of mounting a leg rest to a reclining passenger seat has a number of disadvantages. The addition of a leg rest mounted to the seat tube or other stationary part of the passenger seat adds additional mounting hardware and linkages that may encroach on the mounting hardware and linkages for the seat back and seat bottom. Additional hardware may also be necessary to coordinate the motion of the seat back, seat bottom, and leg rest during seat recline.

Because of the additional hardware, the addition of more moving parts to a reclining seat, like a leg rest, often times leads to compromises in the range and type of motion available to each individual seat component. Not only do the additional mechanical parts restrict motion, but allowances for complementary ranges of motion for different portions of the passenger seat further diminishes available motion to avoid impingement of the portions of the passenger seat on one another.

In certain cases, it may be desirable to provide a passenger seat with a deployable leg rest that is coupled directly to the seat bottom. This arrangement may allow the leg rest to move and articulate with the seat and pivot and/or extend away from the seat bottom during deployment. The resulting mechanism, including an actuator to initiate and deploy the leg rest, is often simpler, lighter, and more compact than existing leg rest mechanisms. Such an integrated leg rest may allow for a greater range of movement for the seat back and seat bottom by reducing the amount of hardware contained under and within the seat and moving with the seat bottom to avoid interference with other reclining mechanisms and hardware.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat may comprise a deployable leg rest coupled to a seat bottom and an actuator coupled to the deployable leg rest and the seat bottom. The actuator may induce deployment of the deployable leg rest.

In some embodiments, the seat bottom is moveable during the reclining of the passenger seat.

In some embodiments, the actuator may comprise a gas-charged cylinder.

In certain embodiments, the actuator may comprise a spring.

In some embodiments, the spring may comprise a coil spring.

In certain embodiments, the spring may comprise a torsion spring.

In some embodiments, the actuator may comprise a spring in combination with a gas-charged cylinder.

In some embodiments, the passenger seat further comprises a control button to initiate deployment of the deployable leg rest.

In certain embodiments, the passenger seat further comprises a locking mechanism to maintain the position of the deployable leg rest in a deployed position, a stowed position, or any intermediate position.

In some embodiments, the locking mechanism may comprise a ratchet.

In certain embodiments, the locking mechanism may comprise a clutch.

In some embodiments, the clutch may comprise a force-limiting clutch.

In some embodiments, the clutch may comprise a one-way clutch.

In certain embodiments, the actuator may comprise an electrically powered actuator.

In some embodiments, the electrically powered actuator may comprise an electric motor and gearing system to provide a torque to the deployable leg rest.

In certain embodiments, the electrically powered actuator may comprise an electric motor and lead screw.

In certain embodiments, the actuator may provide a deploying force to deploy the deployable leg rest.

In some embodiments, the actuator may provide a retracting force to retract the deployable leg rest.

In some embodiments, the deployable leg rest may rotate and extend between a stowed position and a deployed position.

According to certain embodiments of the present invention, a passenger seat may comprise a deployable leg rest coupled to a seat bottom, a gas-charged cylinder providing a motive force, a locking mechanism, and a control button in communication with the locking mechanism. The gas-charged cylinder may be coupled to the deployable leg rest and the seat bottom and the locking mechanism may lock the deployable leg rest in a stowed position. The control button may release the locking mechanism and allow the motive force of the gas-charged cylinder to deploy the deployable leg rest.

BRIEF DESCRIPTION OF THE DRAWINGS

FIG. 4 is a perspective view of an integrated deployable leg rest shown in relation to a passenger seat in a deployed position, according to certain embodiments of the present invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide a deployable leg rest for reclining passenger seats. While the leg rests are discussed for use with aircraft seats, they are by no means so limited. Rather, embodiments of the leg rest may be used in passenger seats or other seats of any type or otherwise as desired.

Figure 1:
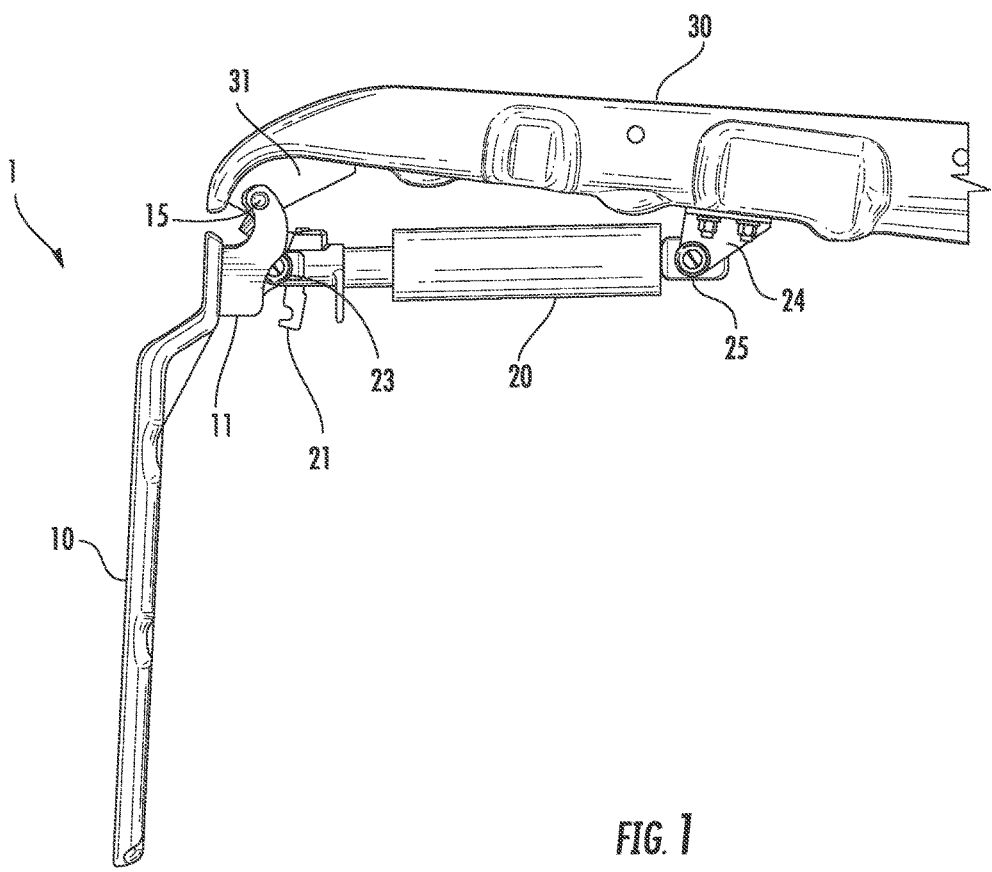
FIG. 1 is a side elevation view of an integrated deployable leg rest in a stowed position, according to certain embodiments of the present invention.
Figure 2:
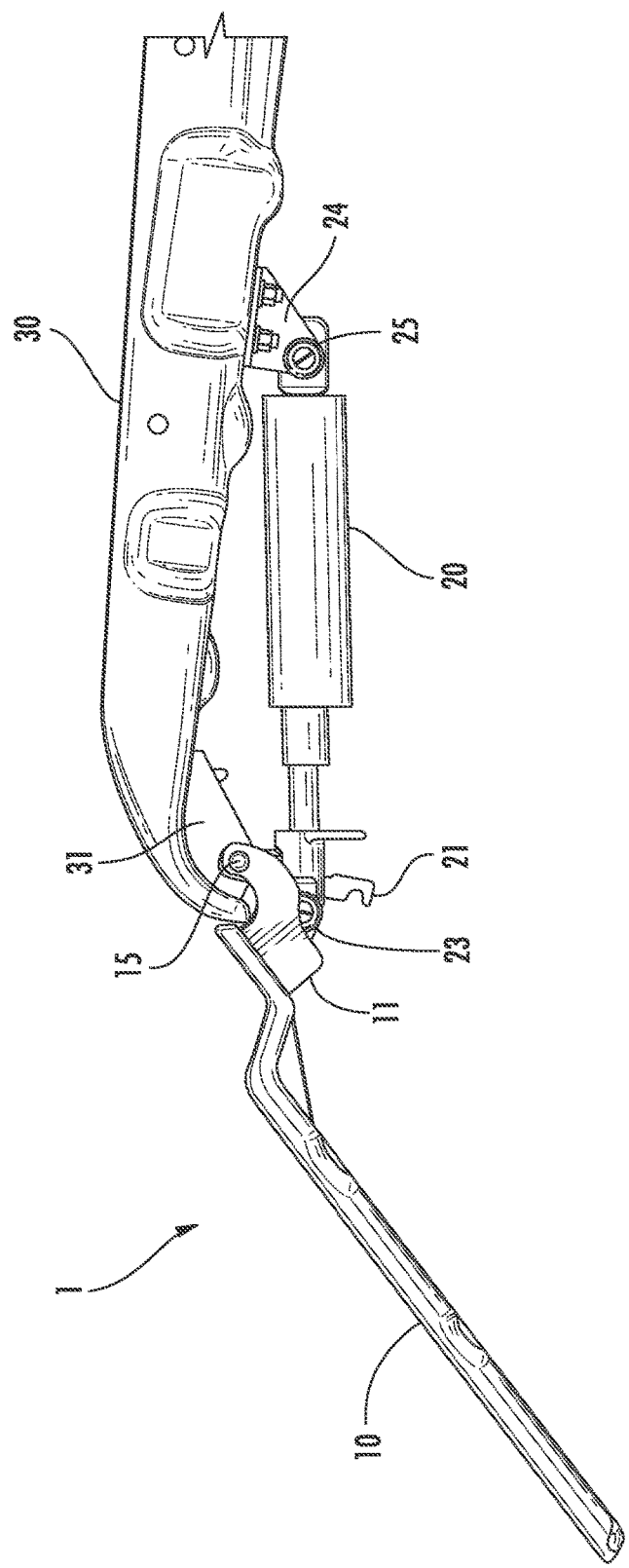
FIG. 2 is a side elevation view of an integrated deployable leg rest in a deployed position, according to certain embodiments of the present invention.

In some embodiments of the present invention, as shown in FIGS. 1 and 2, a passenger seat bottom with an integrated deployable leg rest 1 comprises a deployable leg rest 10 coupled to a seat bottom 30 through a leg rest hinge 15. In FIG. 1, the deployable leg rest 10 is shown in a stowed position. FIG. 2 shows the deployable leg rest 10 in a deployed position. The leg rest hinge 15 is comprised of a leg rest bracket 11 and a seat bottom bracket 31 coupled to one another by a pin, bolt, screw, rivet, or other suitable component to serve as the axle or pivot of the leg rest hinge 15. The deployable leg rest 10 may then pivot around the leg rest hinge 15.

Still referring to FIGS. 1 and 2, an actuator 20 is mounted between the seat bottom 30 and the deployable leg rest 10. In certain embodiments, the actuator 20 may be coupled at one end to the seat bottom 30, which may be stationary or moveable as the passenger seat reclines, through a rear actuator bracket 24. The rear actuator bracket 24 connects to the actuator 20 at a rear actuator pivot 25. As the actuator 20 moves through its range of motion, it may pivot around the rear actuator pivot 25 and the rear actuator bracket 24. Similarly, the actuator 20 is coupled to the deployable leg rest 10 through a front actuator bracket (not shown) that provides a front actuator pivot 23. As the actuator 20, here shown as a gas-charged cylinder, expands and contracts through its range of motion, it will pivot around the front actuator pivot 23 and rear actuator pivot 25. In certain embodiments, the actuator 20 may also include an actuator release 21. The actuator release 21 may be manipulated by a wire, lever, or other mechanism (not shown) to allow the actuator 20 to move through its range of motion. When the actuator release 21 is not engaged, the actuator 20 may provide a self-locking function to hold the deployable leg rest 10 steady at any point between a deployed position and a stowed position.

Figure 3:
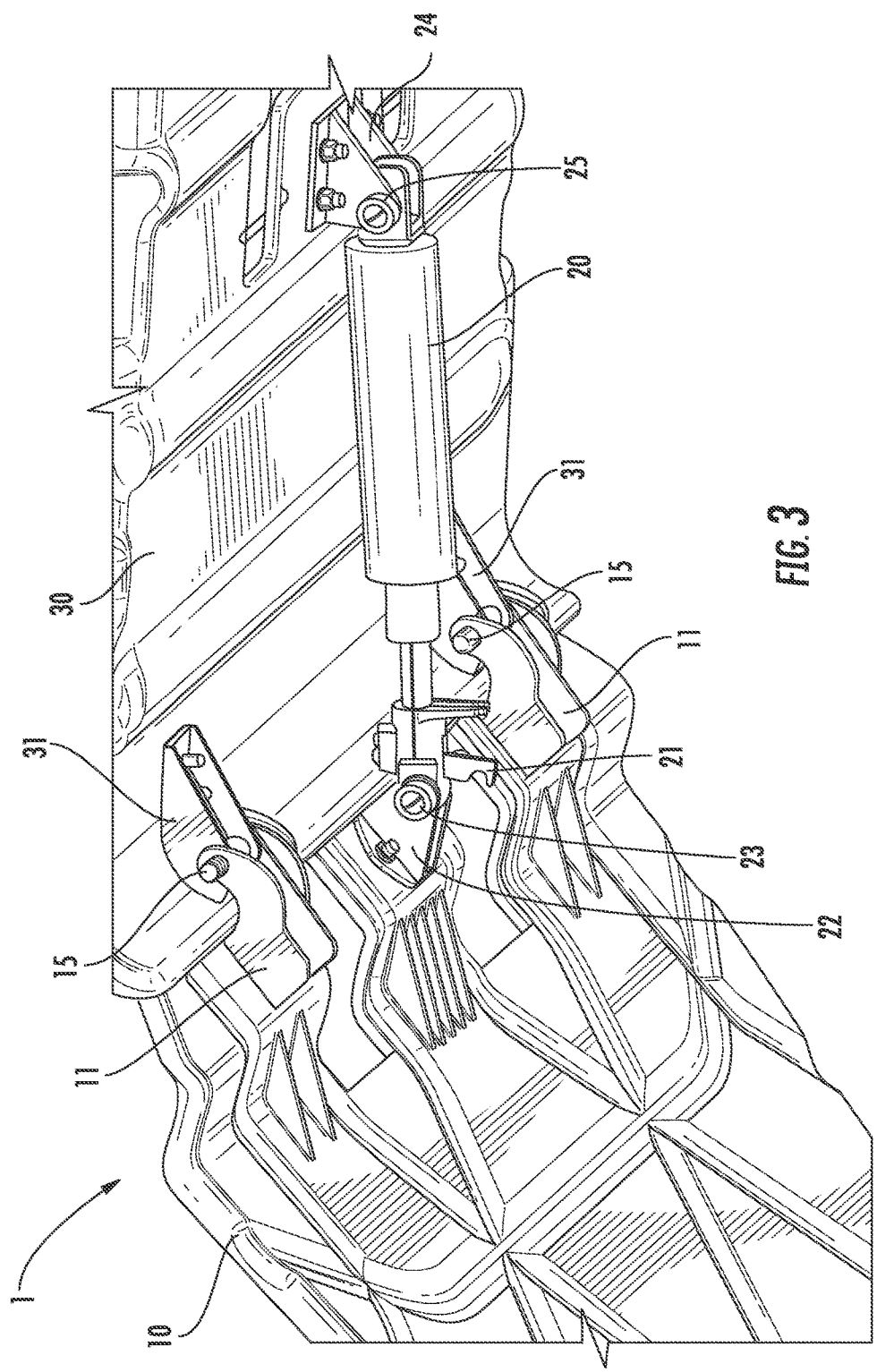
FIG. 3 is a perspective view of an integrated deployable leg rest in a deployed position, according to certain embodiments of the present invention.

FIG. 3 is a bottom perspective view of an embodiment of the integrated deployable leg rest 1. In certain embodiments, the deployable leg rest 10 is coupled to the seat bottom 30 through a pair of leg rest hinges 15. The leg rest hinges 15 may be composed of a leg rest bracket 11 pivotally coupled to a seat bottom bracket 31 with a pin, rivet, bolt, screw, or other suitable component to serve as the axle or pivot point of the leg rest hinges 15. The integrated deployable leg rest 1 also includes an actuator 20 coupled to both the deployable leg rest 10 and the seat bottom 30. The actuator 20 is disposed between the deployable leg rest 10 and the seat bottom 30 so that as the actuator 20 moves through its range of motion, the deployable leg rest 10 will move between a stowed position and a deployed position. The actuator 20 is coupled to the deployable leg rest 10 with a front actuator bracket 22. The front actuator bracket 22 is coupled to the deployable leg rest 10 and the actuator 20 such that the actuator 20 may pivot around the front actuator pivot 23. The pivoting movement of the actuator 20 around the front actuator pivot 23 allows the actuator 20 to move the deployable leg rest 10 freely through its range of motion without binding. Similarly, the actuator 20 is coupled to the seat bottom 30 through a rear actuator bracket 24 that provides a rear actuator pivot 25. If the actuator 20 is a linear actuator as shown in FIG. 3 (here, a gas-charged cylinder), the use of a front actuator pivot 23 and a rear actuator pivot 25 allows the actuator 20 to move through its range of motion without having to support any twisting or moment loads about the front actuator bracket 22 or rear actuator bracket 24. The actuator 20 will only support a linear force as it moves the deployable leg rest 10, as it will pivot about the front actuator pivot 23 and rear actuator pivot 25. This type of motion, where the actuator 20 need not support any twisting or moment forces, allows for the use of a smaller, lighter actuator 20. Furthermore, in the case of a gas-charged cylinder serving as the actuator 20, the lack of twisting or moment forces about the front actuator pivot 23 and rear actuator pivot 25 will reduce strain on the cylinder seals, helping to prevent leakage and allow for a longer service life with reduced maintenance costs. The actuator 20 also may include an actuator release 21. The actuator release 21, which may be activated by a cable, lever, or other means of articulation, can be controlled through a button or lever mounted on the console or armrest of the passenger chair (not shown). The passenger may then use the button or lever to activate the actuator release 21 to allow the deployable leg rest 10 to move between the stowed and deployed positions.

FIG. 4 is a perspective view of an embodiment of the integrated deployable leg rest 1 shown in relation to a passenger seat. The deployable leg rest 10, shown here in a deployed position, is coupled to a seat bottom 30. The seat back 40, seat console 41, and seat tubes 42 are also shown for context. The deployable leg rest 10 is coupled to the seat bottom 30 through leg rest hinges 15, which are comprised of leg rest brackets 11 and seat bottom brackets 31 (not shown, FIG. 3). The deployable leg rest 10 may pivot around the leg rest hinges 15 to move between a stowed and deployed position.

Still referring to FIG. 4, the integrated deployable leg rest 1 also includes an actuator 20 which is coupled to the deployable leg rest 10 with a front actuator bracket 22. The front actuator bracket 22 provides a front actuator pivot 23 that allows the actuator 20 to rotate around the front actuator pivot 23 as it moves the deployable leg rest 10 between stowed and deployed positions. Similarly, the actuator 20 may be coupled to the seat bottom 30 through a rear actuator bracket 24 that provides a rear actuator pivot 25. The actuator 20 may also have an actuator release 21. The actuator 20 may have an internal locking mechanism that prevents the actuator 20, and subsequently the deployable leg rest 10, from moving when the actuator release 21 is not engaged. The actuator release 21 may be controlled by a cable, lever, or other suitable mechanism that may be connected to a control button or lever mounted on the passenger seat console or arm rest. A passenger may then use the control button or lever to activate the actuator release 21 to allow the movement of the actuator 20 and deployable leg rest 10.

FIGS. 1-4 illustrate the integrated deployable leg rest 1 according to certain embodiments of the present invention. However, a number of alterations, modifications, or adaptations may be made to suit particular applications or design requirements. For example, in FIGS. 1-4 above, the actuator 20 is generally shown as a gas-charged cylinder. In certain embodiments, the gas-charged cylinder would exert a linear force through expansion to move the deployable leg rest 10 from a stowed position to a deployed position. Normally, the actuator release 21 may serve a locking function to hold the actuator 20, such as a gas-charged cylinder, in place. A passenger may then engage the actuator release 21 to allow movement of the actuator 20 and the deployable leg rest 10. The passenger can then control the movement of the deployable leg rest 10 by either allowing the deployable leg rest 10 to be extended into a deployed position by the actuator 20, or by pressing down on the deployable leg rest 10 to overcome the force of the actuator 20 and return the deployable leg rest 10 to a stowed position. The passenger may then disengage the actuator release 21 to lock the deployable leg rest 10 in the desired position.

In certain embodiments, the actuator 20 may take on any number of different mechanisms or configurations. For example, the actuator 20 may be a spring mechanism. The actuator 20 may comprise a linear spring, such as a coil spring, that is mounted or attached to the deployable leg rest 10 and seat bottom 30 in a similar manner as that shown in FIGS. 1-4. In other embodiments, the actuator 20 may comprise a torsion spring that provides a torque to rotate the deployable leg rest 10 about the leg rest hinge 15. In certain embodiments, a torsion spring actuator may be mounted directly to one or more leg rest hinges 15, or another point of rotation, to provide the force to deploy or stow the deployable leg rest 10. In other embodiments, the actuator 20 may comprise a gas-charged cylinder and a spring, either linear or torsion, working in combination to provide the motive force to deploy or stow the deployable leg rest 10.

In some embodiments, the actuator 20 may comprise an electrically powered actuator. Electric actuators may either provide a rotational or linear force to the deployable leg rest 10. In certain embodiments, the electric actuator may comprise an electric motor coupled to the leg rest hinge 15 either directly or through a gearing system. In other embodiments, the actuator 20 may be an electrically powered linear actuator. For example, an electric motor may be coupled to a lead screw or lead screw collar. An electric motor may then rotate either the lead screw or the lead screw collar to cause an extension or retraction of the lead screw. The extension or retraction of the lead screw may provide a linear motion that deploys or stows the deployable leg rest 10. Electrically powered actuators may offer a number of advantages over other mechanical actuator systems. In some embodiments, the electrically powered actuators may not require the use of a locking mechanism or actuator release 21 because the electric motor or gearing system provides a locking function without the use of an extra component. Also, in certain embodiments, the electrically powered actuator may provide both deploying and stowing forces to move the deployable leg rest 10 in both directions without the need for a passenger to exert any pressure on the deployable leg rest 10 or overcome the force of a purely mechanical actuator 20.

In certain embodiments, the integrated deployable leg rest 1 may include a number of different locking and release mechanisms to selectively hold or allow for the movement of the deployable leg rest 10. As shown in FIGS. 1-4, a gas-charged cylinder may have an integrated locking function that is released with an actuator release 21. In some embodiments, regardless of the type of actuator 20 used, a separate locking mechanism may be used to stabilize the deployable leg rest 10. In some embodiments, a ratcheting mechanism may be used to prevent the deployable leg rest 10 from moving in one direction while allowing it to move freely in another direction. The locking mechanism, or ratchet, may be connected to a control button allowing the passenger to release the locking mechanism or ratchet so that the deployable leg rest 10 may move in either direction. For example, a ratcheting mechanism may be used to oppose the deployment force of an actuator 20. A passenger may press a control button mounted on the arm rest or seat console to release the ratcheting mechanism allowing the actuator 20 to deploy the deployable leg rest 10. When the deployable leg rest 10 is at a desired height, the passenger may release the control button engaging the ratchet or locking mechanism to prevent further deployment of the deployable leg rest 10. In this intermediate or deployed position, the ratchet will prevent further deployment of the deployable leg rest 10, and the actuator 20 will prevent retraction of the deployable leg rest 10 providing a stable platform for the passenger. In certain embodiments, the force of the actuator 20 may be enough to stabilize the deployable leg rest 10 and support the weight of the passenger's lower legs, but is still low enough that the passenger may press down on the deployable leg rest 10 to return it to a stowed position. The passenger would not need to use the control button to stow the deployable leg rest 10 because the ratchet or locking mechanism would not oppose movement in that direction.

Additional locking mechanisms may be useful or preferable in other embodiments of the present invention. For example, a one-way clutch may be used in a similar manner as the ratchet locking mechanism described above. In some embodiments, a force-limiting clutch may provide certain advantages and additional functionality. Force-limiting clutches provide a certain degree of locking force that, once exceeded, will release the clutch or allow for slippage between clutch elements. A force-limiting clutch may be used to stabilize the deployable leg rest 10 up to a certain amount of force or pressure, but break away and allow movement if that amount of force or pressure is exceeded. In the case of a deployable leg rest 10, a force-limiting clutch may be used to lock the deployable leg rest 10 into a desired position under normal circumstances and use. However, if the amount of locking force provided by the force-limiting clutch is exceeded, like when a passenger may attempt to stand on the deployable leg rest 10, the force-limiting clutch will slip or release and allow the deployable leg rest 10 to move and prevent damage to the deployable leg rest 10, actuator 20, or other parts of the passenger seat.

In certain embodiments, the motion of the deployable leg rest 10 may not be exclusively rotational about an axis. The deployable leg rest 10 may rotate, translate, or both rotate and translate through a range of motion between a stowed and deployed position. In some embodiments, the connection between the deployable leg rest 10 and the seat bottom 30 may include a rotating element, such as a hinge, and a translating element like a carriage and track.

Any of the above described components, parts, or embodiments may take on a range of shapes, sizes, or materials as necessary for a particular application of the described invention. The components, parts, or mechanisms of the described invention may be made of any materials selected for the suitability in use, cost, or ease of manufacturing. Materials including, but not limited to aluminum, stainless steel, fiber reinforced plastics, composites, polycarbonate, polypropylene, other metallic materials, or other polymers may be used to form any of the above described components.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
   a seat bottom comprising a lower surface;
   at least one seat tube disposed below the seat bottom;
   a movable leg rest comprising:
      an attachment to the seat bottom;
      a stowed position; and
      a deployed position;
   an actuator extending between the movable leg rest and the seat bottom and disposed above the at least one seat tube, the actuator comprising:
      a front attachment to the movable leg rest; and
      a rear attachment to the lower surface of the seat bottom, wherein the rear attachment between the actuator and the seat bottom comprises a rear actuator bracket fixedly attached to the lower surface of the seat bottom such that at least one fastener extends from the rear actuator bracket into the lower surface of the seat bottom,
   wherein the actuator moves the movable leg rest between the stowed position and the deployed position.

2. The passenger seat of claim 1, wherein the seat bottom is movable during reclining of the passenger seat.

3. The passenger seat of claim 1, wherein the actuator comprises at least one of a spring, an electrically powered actuator, and a gas-charged cylinder.

4. The passenger seat of claim 1, wherein the actuator comprises at least one of a torsion spring and a coil spring.

5. The passenger seat of claim 1, further comprising a control button to initiate deployment of the movable leg rest.

6. The passenger seat of claim 1, further comprising a locking mechanism to maintain the movable leg rest in the deployed position, the stowed position, or an intermediate position.

7. The passenger seat of claim 6, wherein the locking mechanism comprises at least one of a clutch, a force-limiting clutch, a one-way clutch, and a ratchet.

8. The passenger seat of claim 1, wherein the actuator is electrically powered and comprises an electric motor and gearing system to provide a torque to the movable leg rest.

9. The passenger seat of claim 1, wherein the actuator comprises a lead screw.

10. The passenger seat of claim 1, wherein the actuator provides a deploying force to move the movable leg rest toward the deployed position and a retracting force to move the movable leg rest toward the stowed position.

11. The passenger seat of claim 1, wherein the actuator maintains a substantially constant orientation relative to the seat bottom in both the stowed position and the deployed position.

12. The passenger seat of claim 1, wherein the movable leg rest rotates and extends between the stowed position and the deployed position.

13. The passenger seat of claim 1, wherein the movable leg rest rotates between the stowed position and the deployed position.

14. The passenger seat of claim 1, wherein the at least one fastener comprises a plurality of fasteners.

15. The passenger seat of claim 1 wherein the rear actuator bracket comprises two offset protrusions and a pivot for the actuator.

16. The passenger seat of claim 1, wherein the front attachment between the actuator and the movable leg rest comprises a front actuator bracket fixedly attached to the movable leg rest.

17. The passenger seat of claim 16, wherein the front actuator bracket is fixedly attached to a lower surface of the movable leg rest and the front actuator bracket comprises two offset protrusions and a pivot for the actuator.

18. The passenger seat of claim 1, wherein the attachment between the movable leg rest and the seat bottom comprises:
   at least two leg rest brackets fixedly attached to the movable leg rest adjacent to a rear end of the movable leg rest; and
   at least two seat bottom brackets fixedly attached to the lower surface of the seat bottom adjacent to a front end of the seat bottom.

19. The passenger seat of claim 1, wherein the actuator further comprises an actuator release attached at the front attachment, wherein the actuator release comprises a first position where the actuator is prevented from moving and a second position where the actuator is capable of moving.

20. A passenger seat comprising:
   a seat bottom;
   a movable leg rest comprising:
      an attachment to the seat bottom;
      a stowed position; and
      a deployed position;

an actuator extending between the movable leg rest and the seat bottom and providing a motive force to move the movable leg rest between the stowed position and the deployed position, the actuator comprising:
a front attachment to the movable leg rest; and
a rear attachment to the seat bottom, wherein:
the rear attachment between the actuator and the seat bottom comprises a rear actuator bracket fixedly attached to the seat bottom such that at least one fastener extends from the rear actuator bracket into the seat bottom;
the front attachment between the actuator and the movable leg rest comprises a front actuator bracket fixedly attached to the movable leg rest; and
the actuator maintains a substantially constant orientation relative to the seat bottom in both the stowed position and the deployed position.

21. The passenger seat of claim 20, further comprising a frame assembly, wherein:
the frame assembly comprises at least one seat tube extending in a lateral direction of the passenger seat; and
the actuator is disposed above the at least one seat tube and the actuator is attached to the seat bottom independently of the frame assembly.

22. The passenger seat of claim 20, wherein the movable leg rest rotates between the stowed position and the deployed position.

23. The passenger seat of claim 20, wherein the rear actuator bracket is fixedly attached to a lower surface of the seat bottom.

24. The passenger seat of claim 20, wherein the actuator further comprises an actuator release attached at the front attachment, wherein the actuator release comprises a first position where the actuator is prevented from moving and a second position where the actuator is capable of moving.

25. A passenger seat comprising:
a seat bottom comprising a lower surface;
at least one seat tube disposed below the seat bottom;
a movable leg rest comprising:
an attachment to the seat bottom;
a stowed position; and
a deployed position;
an actuator extending between the movable leg rest and the seat bottom and disposed above the at least one seat tube, the actuator comprising:
a front attachment to the movable leg rest; and
a rear attachment to the lower surface of the seat bottom;
an actuator release attached at the front attachment, wherein the actuator release comprises a first position where the actuator is prevented from moving and a second position where the actuator is capable of moving,
wherein the actuator moves the movable leg rest between the stowed position and the deployed position.

* * * * *